3,470,427
SEMICONDUCTOR LASER DEVICES
Akira Kawaji and Hiroo Yonezu, Tokyo, Japan, assignors to Nippon Electric Company, Ltd.
Filed Jan. 30, 1967, Ser. No. 612,574
Claims priority, application Japan, Jan. 31, 1966, 41/5,497
Int. Cl. H01l 5/00; H01s 3/00; H01j 1/62
U.S. Cl. 317—234                                    5 Claims

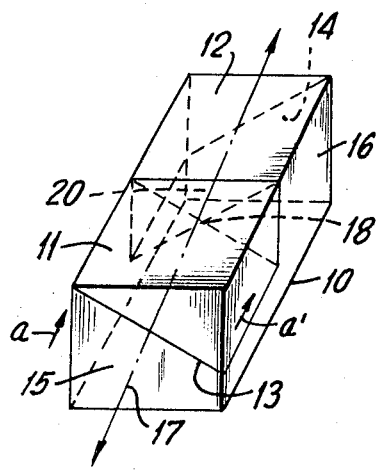
FIG. I
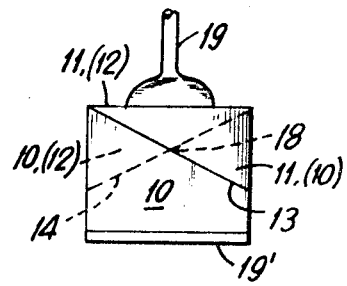
FIG. 2
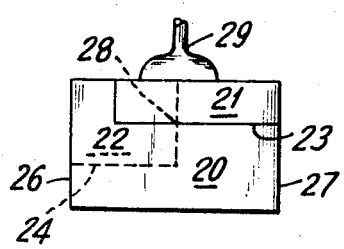
FIG. 3
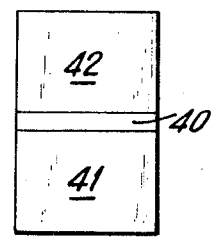
FIG. 4
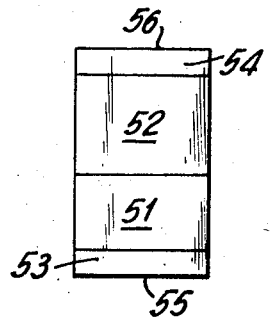
FIG. 5

ABSTRACT OF THE DISCLOSURE

A semiconductor laser including a semiconductor crystal of one conductivity type having a pair of optically flat and mutually parallel side faces, and at least two regions of opposite conductivity types arranged in such a manner that each of the P-N junction interfaces, between the crystal and the regions, is disposed perpendicularly to the side faces so that if extended, the interfaces would intersect each other, and define a line of lasing action.

---

This invention relates generally to semiconductor P-N junction lasers and more particularly to a novel injection laser structure of the type incorporating a plurality of P-N junctions in a single semiconductor element.

Conventional semiconductor lasers are known composed of a single GaAs crystal as the semiconductor base material, and having a plurality of regions of conductivity type opposite to that of the base material, formed in the single crystal so as to establish planar P-N junctions at the boundaries between two different conductivity type regions. A pair of side faces of the element is perpendicular to any one of the P-N junction planes and is finished to optically flat and mutually parallel planes so as to serve as an optical resonator.

Where current is injected across these P-N junctions in the forward direction through a pair of electrodes installed on the top and bottom surfaces of the element (which surfaces may be respectively P and N conductivity types) laser action takes place due to a phenomenon known as stimulated emission of radiation occuring at laser active regions in the vicinity of these P-N junctions (provided, of course, the injected current is in excess of a threshold value).

While a variety of semiconductor laser structures has been suggested, including the foregoing, none of them has succeeded in producing a highly parallel and intense laser beam. This is due to the fact that the stimulated emission of radiation of such lasers occurs invariably at widespread active regions in the vicinity of the P-N junctions, and not at narrow regions adapted for point sources.

Accordingly, it is the object of this invention to provide semiconductor laser structures with which laser action can take place in an intense single mode and which is capable of emitting a laser beam from a substantially perfect point source.

It is another object of this invention to provide semiconductor laser structures incorporating a plurality of P-N junctions wherein the cassation and/or intensity of stimulated emission of radiation originating from at least one of the plurality of junctions can be controlled by the interacting effect of that originating from at least one of the remaining junctions, when a plurality of electrode pairs is installed on the top and bottom surfaces of the element.

Briefly, the invention is predicated upon the provision of at least two P-N junction planes within a single laser element so disposed that they produce, if extended, at least one straight intersection line, without a common plane, which is substantially perpendicular to the opposite reflecting side faces. Consequently, each depletion layer (i.e., junction plane), either physically or as extended, reaches the reflecting surfaces in the form of a thin linear optical guide.

Since the absorption or diffraction of the stimulated emission of radiation is minimized in the linear optical path and the Q of the optical resonator is exceedingly high, the stimulated emission of radiation in a single mode, highly intense and thin-beamed, occurs at the guide.

In considering laser structures incorporating plural P-N junctions, it will be obvious to one skilled in the art, in view of known quenching and excitation effects, that the quenching or intensity of the stimulated emision of radiation occurring at at least one of these P-N junctions, by the injection of current thereacross in the forward direction, may be controlled by the effect of the interaction of other P-N junctions.

In undertaking the following description, it should be borne in mind that with the semiconductor laser structures constructed according to the principles of this invention, it is not indispensable that each of the P-N junction planes physically intersects the opposing reflecting surfaces, but that each of the planes needs intersect the surfaces only if extended. In other words, lasing action can occur even if a part of the base material is interposed between a region of conductivity type opposite to that of the base material and either of the reflecting surfaces. The junction plane need only perpendicularly intersect the reflecting surface when geometrically extended, provided the base material be of N conductivity type and the degree of optical absorption of the interposed material is small (e.g., the transparency of the material is high).

The above-mentioned and other features and objects of this invention and the manner attaining them will become more apparent and the invention itself will best be understood by reference to the following description of embodiments of the invention taken in conjunction with the accompanying drawings wherein:

FIG. 1 is a schematic representation of the configuration of a semiconductor laser element according to an embodiment of this invention;

FIG. 2 is a side view of the element shown in FIG. 1, as viewed in the direction indicated by the arrows, with electrodes affixed respectively at the top and the bottom surface of the element.

FIG. 3 is a side view of a semiconductor laser element according to a second embodiment of this invention;

FIGS. 4 and 5 are top views of semiconductor laser elements according to further embodiments of this invention.

Referring now to FIGS. 1 and 2, and N conductivity type base semiconductor crystal 10 of gallium arsenide, containing tellurium to a carrier concentration of the order of $3 \times 10^{18}$/cc., is formed with a pair of optically flat and mutually parallel reflecting surfaces 15 and 16. The surface finishing may be performed in the well known manner by utilizing the cleavage properties of the GaAs crystal or a mechanical polishing process so as to constitute the previously mentioned optical resonator.

Geometrically, triangular prisms 11 and 12 are respective P conductivity type regions disposed adjacent each other in the base material 10 so as to share a common triangular zone 20 containing zinc atoms therein as conductivity determining impurities.

The depth of P type region 11 as measured from the top surface increases continuously, from left to right, in the illustration, whereas that of P type region 12 increases continuously from right to left. The deepest point in the regions is removed, for example by 25 microns, from the top surface. These regions may be formed in the crystal by the well known selective diffusion technique, or any other conventional process which will fulfill the described design requirements.

Thus, P-N junction planes 13 and 14 formed respectively between regions 11 and 10, and 12 and 10 intersect at cross-over point 18 at a dihedral angle. Each of the junction planes is perpendicular to the opposing reflecting surfaces 15 and 16, with the result that the two junction planes 13 and 14, if extended, produce a common straight line 17 which passes through cross-over point 18 and is also perpendicular to both reflecting surfaces 15 and 16.

Ohmic contact electrodes 19 and 19' are installed at the top and bottom surfaces, respectively, by, for example, plating nickel thereon and then soldering a lead wire to the nickel film plated on the top surface. In FIG. 2, the reference numerals in parentheses denote a concealed part as viewed from the front reflecting surface.

Upon injecting a suitable current into the laser element, shown in FIGS. 1 and 2, in the direction from electrode 19 to electrode 19', a phenomenon known as minority carrier injection occurs across the junctions 13 and 14, which, in turn, results in the recombination radiation.

With the basic structure according to the first embodiment, the region shared between the two P-N junction depletion layers at which light transmission losses are minimized in the interval bounded by the two opposing reflecting surfaces 15 and 16, is restricted to a linear light path denoted by the line 17.

The stimulated emission of radiation occurring at any path other than the light path 17 will encounter either or both P type regions and/or the N type base material, in its transmission route. Laser emissions occurring at any of such paths are invariably subject to optical absorption or diffraction. Since the laser action will occur most easily in the vicinity of the line of intersection that would be produced if any two junction planes were extended— that is, in an optical path normal to the reflecting surfaces, the line 17 in FIG. 1 will be the only path in the element in which lasing action takes place and the Q value of this optical resonator becomes prominantly high for the laser mode that travels back and forth in this path.

Accordingly, the stimulated emission of radiation occurs only in an extremely narrow path and the number of lasing modes does not increase with current density. Consequently, upon an injecting exitation current with a density of the order of 2,000 amperes per square centimeter across the electrodes, an intense laser beam in a single mode can be obtained with an almost perfect point source.

FIG. 3 is a side view of a semiconductor laser element structure according to a second embodiment of this invention. This figure illustrates the case where the P type regions are each geometrically rectangular prisms formed in the base material by use of the so-called planar technique.

With such a structure, two kinds of stimulated emission of radiation may occur—one in the optical guide which is normal to the resonator reflecting side faces, and the other in a direction normal to the opposite side faces 26 and 27.

To prevent occurrence of the latter unwanted stimulated emission, it is only necessary to deprive the side faces 26 and 27 of optical flatness or parallelism by some suitable means such as surface roughening. P type regions 21 and 22, point 28, and electrode 29 in FIG. 3 correspond respectively to parts denoted by reference numerals 11, 12, 18 and 19.

FIG. 4 illustrates a top view of a semiconductor laser element structure according to a third embodiment of this invention, wherein a thin absorption zone 40, or a part of N type base material, is sandwiched between the two P type regions 41 and 42 in such a manner that the two junction planes intersect, only if extended.

Although the route for stimulated emission of radiation in a single mode is intercepted partly by the existence of the N type base material, the inventive objective of providing a semiconductor laser for producing a laser beam from a point source can be met sufficiently, because the degree of optical absorption in the N conductivity type region is extremely small. P type regions 41 and 42 in FIG. 4 correspond respectively to regions 11 and 18 in FIG. 1 or regions 21 and 22 in FIG. 3, but the two regions are, as mentioned, separated by a small distance thereby differing from the first embodiment.

FIG. 5 is a top view of a semiconductor laser element structure according to a fourth embodiment of the invention, illustrating the case where P type regions 51 and 52 are not in direct contact with the reflecting side faces 55 and 56 respectively, and N type regions 53 and 54 are interposed between 55 and 51, and 56 and 52, respectively. It will be obvious that the object of this invention can be realized in the same manner as mentioned previously referring to FIG. 4.

While the principles of this invention have been described above in connection with illustrated preferred embodiments, it is to be clearly understood that this description and the following suggested alternatives are only exemplary and are not intended as a limitation on the scope of this invention. For example, it will be obvious that there are semiconductor structures other than those illustrated which do not substantially depart from the spirit of this invention. Further, any kind of semiconductor may be used as the base material provided it can be used as a material for a semiconductor P-N junction laser. The conductivity determining impurities for introduction into the base material would, of course, be according to the semiconductor type. Although the number of depletion layers or P-N junctions has been restricted to two in the embodiments, there is no objection for incorporating more than two in an element.

It is also envisaged that a plurality of such semiconductor laser structures be coupled together by use of the selective diffusion technique, for example, into a single semiconductor laser device so that stimulated emission of radiation may be initiated from at least one structure by utilizing the interaction effect of other structures, or the stimulated emission light output of some structures may be conrolled with that of other structures.

What is claimed is:

1. A semiconductor laser device comprising: a semiconductor crystal of one conductivity type having a pair of optically flat and mutually parallel side surfaces; at least two regions of opposite conductivity type formed within said crystal to define at least two P-N junction planes which are non-coplanar, adjacently positioned, and substantially perpendicular to said side surfaces; such that said planes, if extended to said surfaces, would include at least one common straight line of intersection.

2. The semiconductor laser device claimed in claim 1 wherein said surfaces are contiguous respective of said junction planes.

3. The semiconductor laser device claimed in claim 1 wherein said junction planes are contiguous.

4. The semiconductor laser device claimed in claim 1 wherein each of said junction planes lies at oppositely uniformly varying depth from one surface of said crystal.

5. The semiconductor laser device claimed in claim 1 wherein said junction planes as extended in cross-section are crossed lines.

References Cited

UNITED STATES PATENTS 3,349,475   10/1967   Marinace _____ 317—235

OTHER REFERENCES

IBM Technical Disclosure Bulletin, "Semiconductor Scanlaser," by Dill, July 1965, pages 272, 273.

JOHN W. HUCKERT, Primary Examiner

JERRY D. CRAIG, Assistant Examiner

U.S. Cl. X.R.

331—94.5; 313—108